Feb. 21, 1939. D. J. CAMPBELL 2,147,880
MOLD FOR CASTING CRANKSHAFTS
Filed Jan. 6, 1937 12 Sheets-Sheet 2
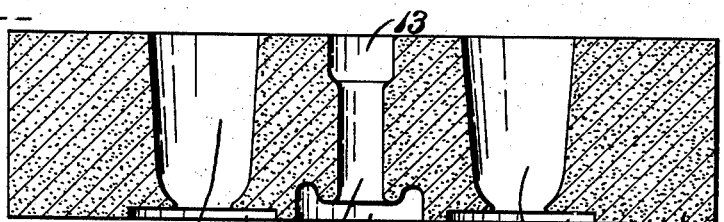
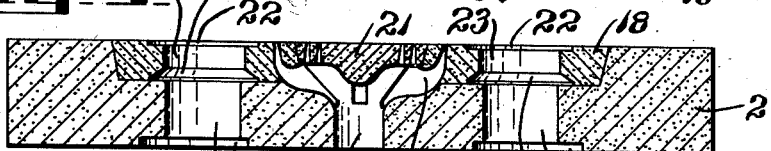
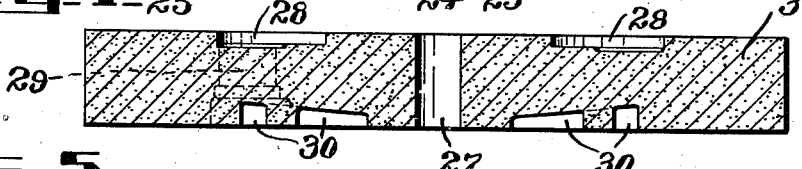
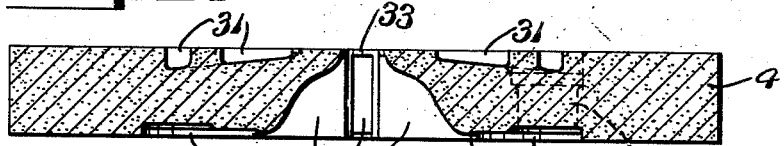
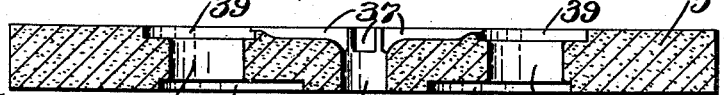
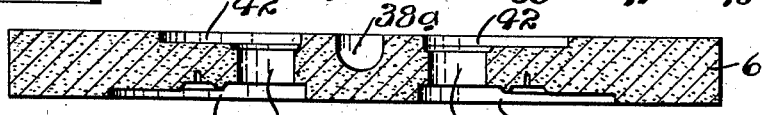
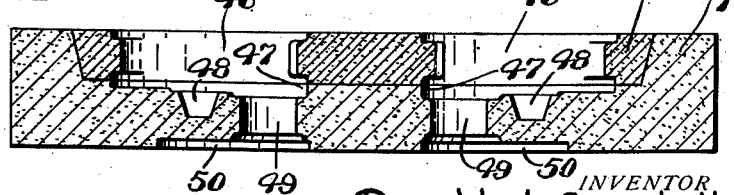
INVENTOR
Donald J. Campbell
BY
ATTORNEYS

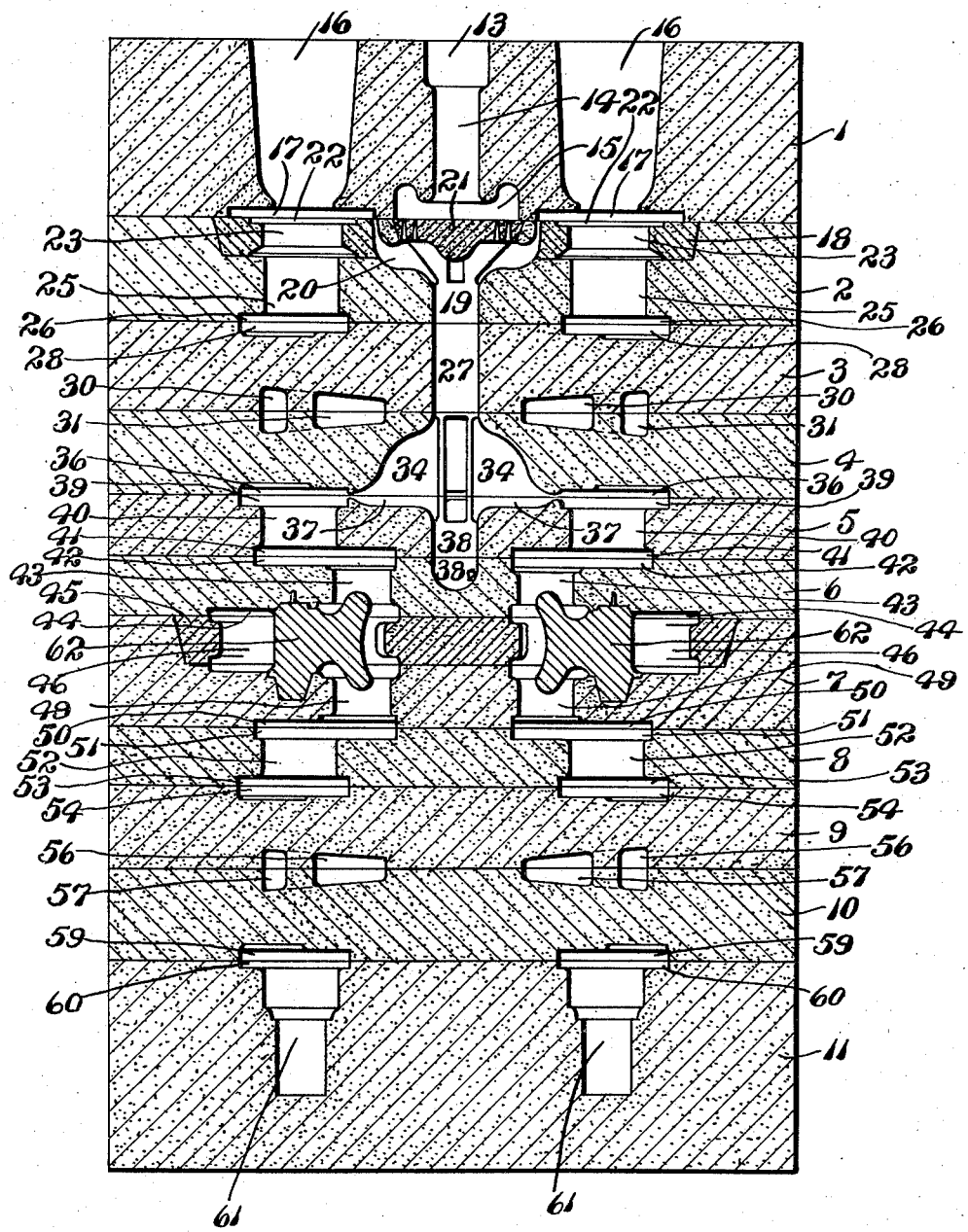

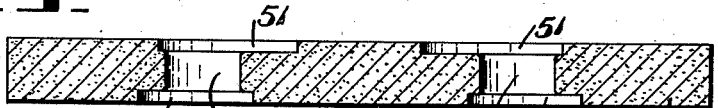
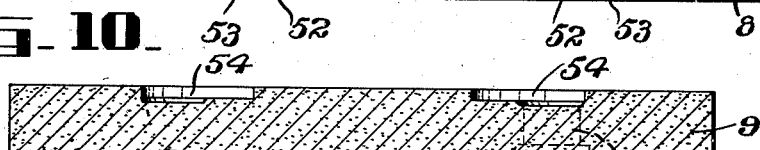
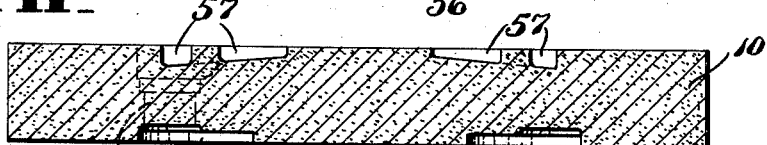
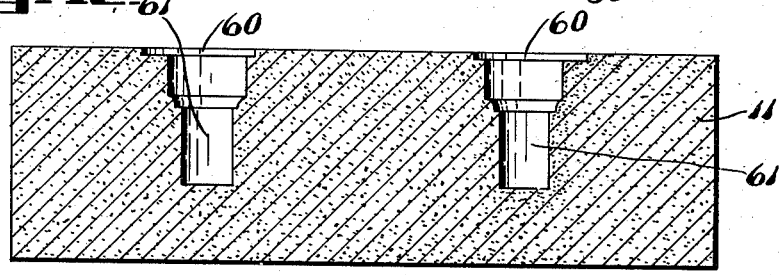

Feb. 21, 1939. D. J. CAMPBELL 2,147,880
MOLD FOR CASTING CRANKSHAFTS
Filed Jan. 6, 1937 12 Sheets-Sheet 4

INVENTOR
Donald J. Campbell
BY
ATTORNEYS

Feb. 21, 1939.　　D. J. CAMPBELL　　2,147,880
MOLD FOR CASTING CRANKSHAFTS
Filed Jan. 6, 1937　　12 Sheets-Sheet 6

INVENTOR
Donald J. Campbell
BY Liverance & Van Antwerp
ATTORNEYS

Feb. 21, 1939.　　　D. J. CAMPBELL　　　2,147,880
MOLD FOR CASTING CRANKSHAFTS
Filed Jan. 6, 1937　　　12 Sheets-Sheet 7

INVENTOR
Donald J. Campbell
BY Liverance & VanAntwerp
ATTORNEYS

INVENTOR
Donald J. Campbell
BY Liverance & Van Antwerp
ATTORNEYS

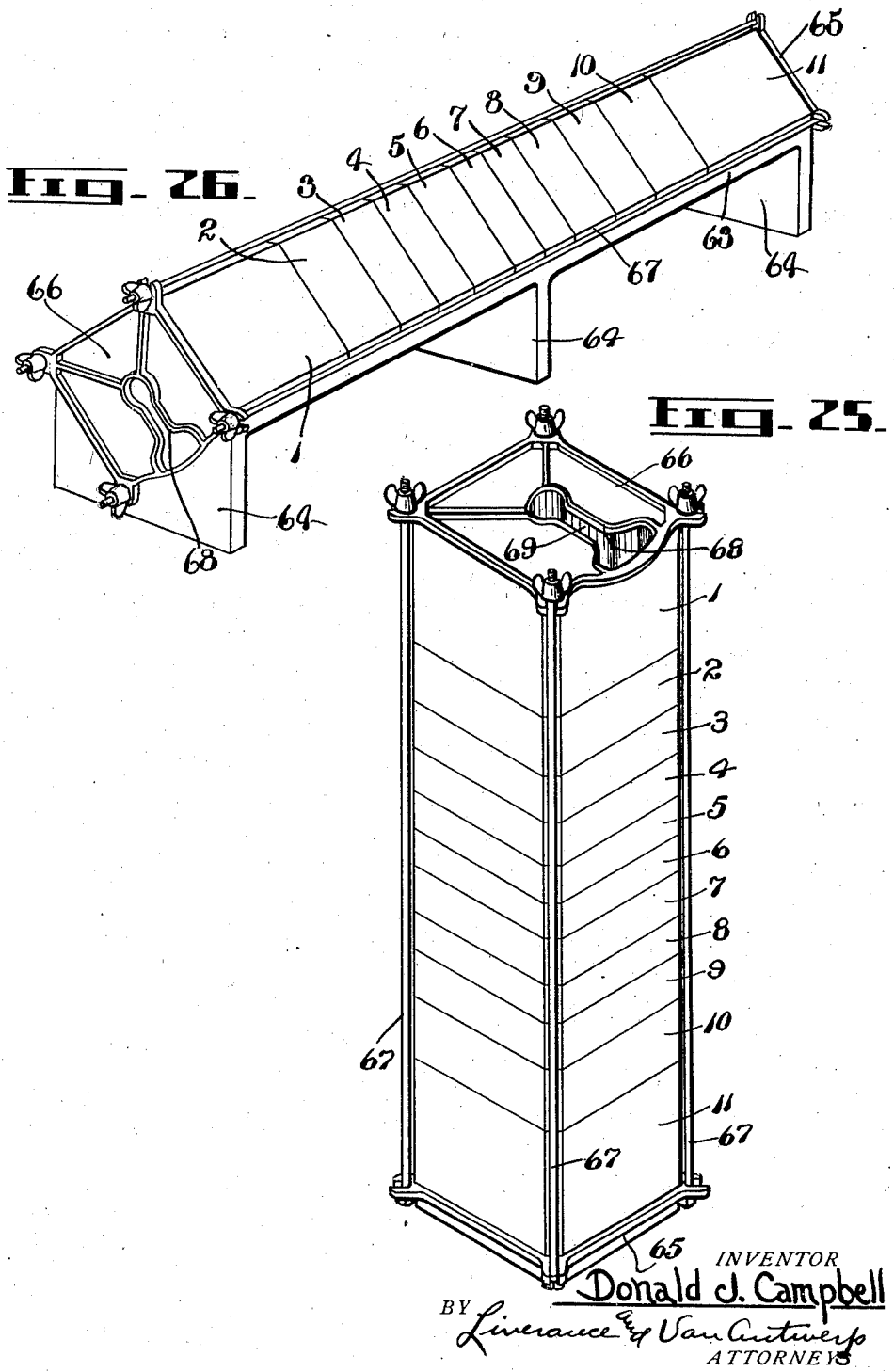

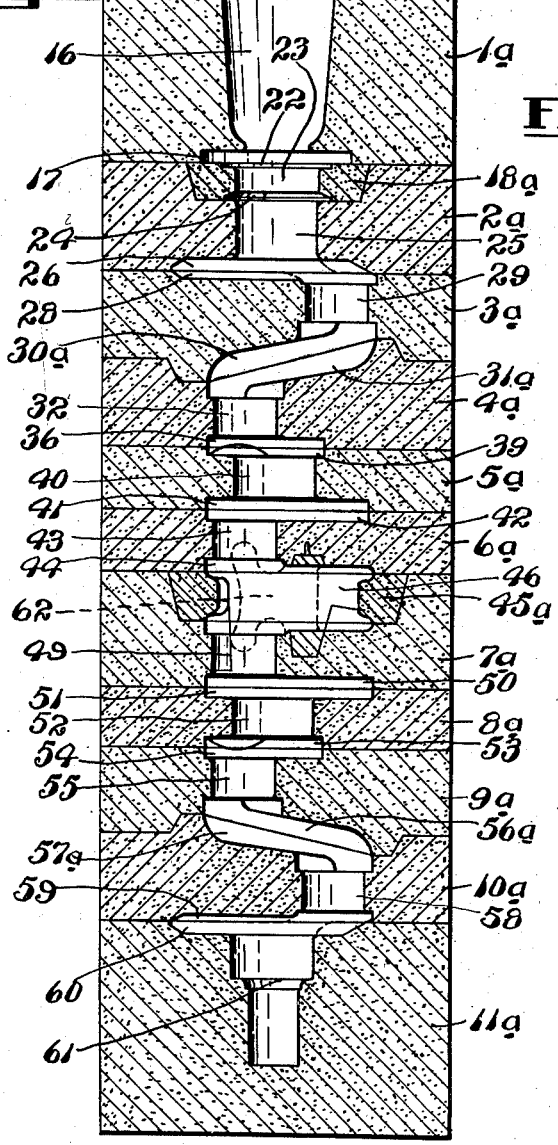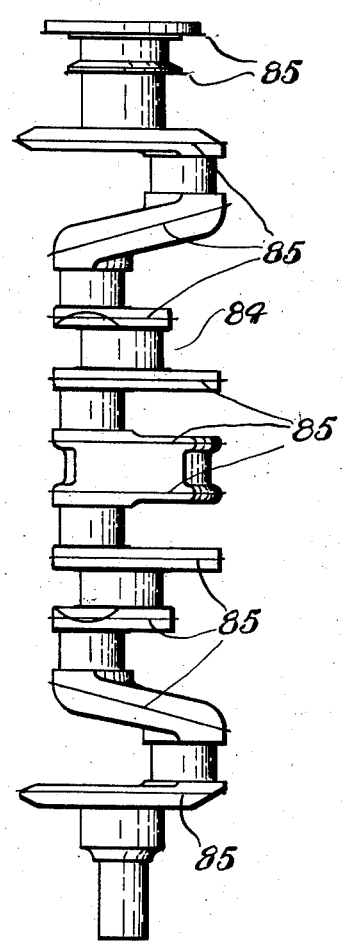

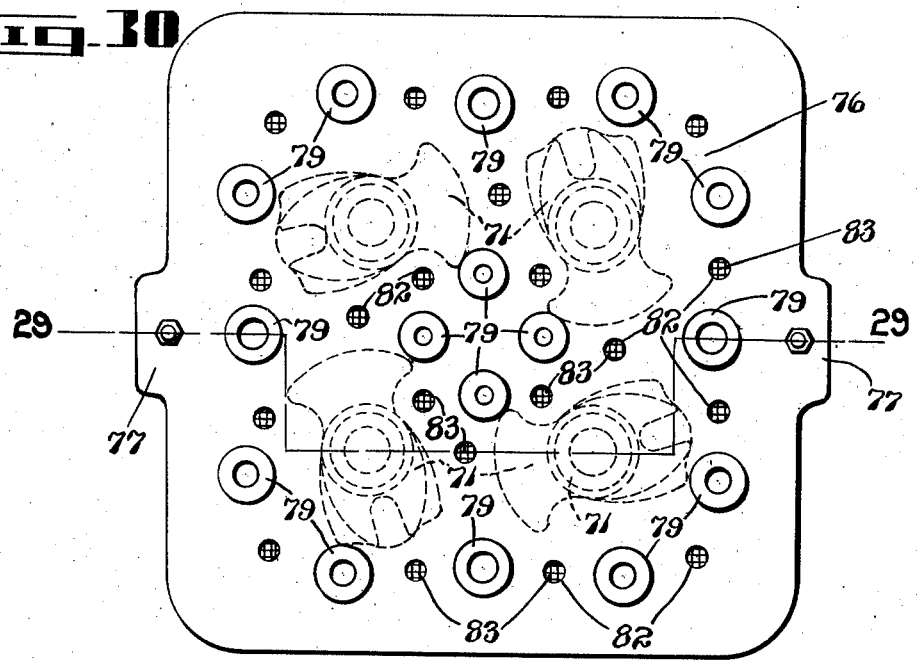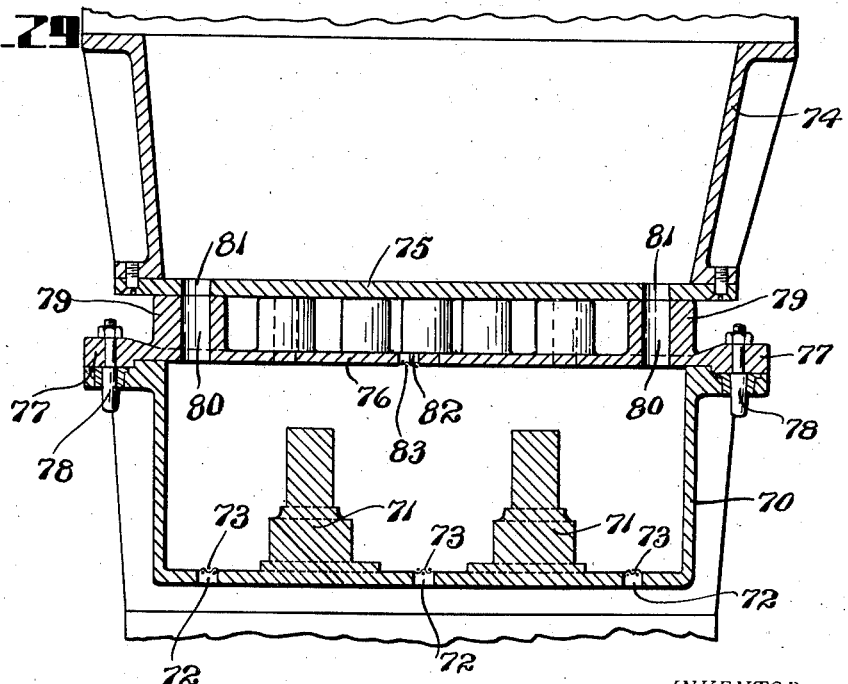

UNITED STATES PATENT OFFICE 2,147,880

MOLD FOR CASTING CRANKSHAFTS

Donald J. Campbell, Spring Lake Township, Ottawa County, Mich.

Application January 6, 1937, Serial No. 119,226

2 Claims. (Cl. 22—129)

This invention relates to crankshaft molding and is primarily concerned with a novel mold and method of producing the same for casting engine crankshafts or similar articles of what may be termed tortuous and irregular shapes, and generally of an elongated character.

Crankshafts for internal combustion engines are produced in very large amounts. Such shafts contain bearings for the shaft and others for the connecting rods which are interposed between the shaft and the pistons of the engine. The connecting rod bearings are offset from the longitudinal axis about which the shaft turns. There are transverse connecting portions or flanks between the several connecting rod bearings, the bearings of the crankshaft itself, and counterweight portions for absorbing and eliminating vibration as much as possible. The crankshafts have generally heretofore been made by forging suitable steel billets for such purpose, but I have for some time been casting such crankshafts by pouring a suitable molten metal into mold cavities having the shape of the crankshafts to be produced. Usually the metal is of a cast iron alloy, relatively low in carbon and containing various alloying elements such as chromium, nickel, molybdenum and the like, the specific composition of the metal comprising no part of the present invention.

With my invention I make up the molds in a series of substantially horizontal sections placed one over the other, each of said mold sections being made from sand and fluid mixture baked to a relatively hard consistency. The dividing lines between the several sections cause the finished casting to have fins at such places which must be removed in the completed crankshaft. One object and purpose of the present invention is to provide a mold wherein any such fins as are thus produced are in every case located on parts of the cast crankshaft between bearing portions thereof, so that no bearing portion has any thin radial fins projecting therefrom which would necessarily have to be ground or otherwise removed in finishing the bearings of the crankshaft. The removal of said fins where the same are on the bearing portions of the crank shaft is a tedious and expensive operation requiring special grinding wheels and special operations. Where the fins are on parts interposed between the bearings such as on the flanks, counterweight portions and any other connecting members between adjacent bearing portions the same may be very quickly and easily rough ground and removed, with an elimination of a considerable part of the expense connected with the finishing of the shafts.

There are many other objects and purposes of the present invention, such as the production of a mold by means of which a plurality of the crankshafts may be cast at one time together with novel structure for conducting the molten metal to the crankshaft mold cavities and controlling the flow of the molten metal thereto so as to cause no breaking of parts of the mold because of impact of the molten iron thereagainst in passing or falling from the upper end of the mold to the lower ends or intermediate portions of the mold cavities. And further, for supplying intermediate the ends of the molds and, therefore, intermediate the ends of the crankshaft, feeder means for supplying molten metal to counteract shrinkage of the metal in cooling in addition to feeder cavities at the upper end of such mold cavities for the same purpose.

These and many other objects and purposes will be apparent upon an understanding of the invention had from the following description, taken in connection with the accompanying drawings, in which, Fig. 1 is a vertical section of a built-up sectional mold made in accordance with my invention.

Figs. 2 to 12, inclusive, are vertical sections taken diagonally through the several sectional parts of the mold, said sectional parts when used being positioned vertically one over and resting upon another as has been shown in Fig. 1.

Fig. 13 is a plan view of the upper end cover for the mold when all of the sections have been assembled and are found together.

Figs. 14 to 24, inclusive, are plan views of the several sections of the mold shown in Fig. 1.

Fig. 25 is a perspective view showing a completed mold and the apparatus and method used for securing and holding the several sections of the mold together.

Fig. 26 is a perspective view illustrating the method whereby the several sections of the mold are disposed and located in proper alinement with respect to each other, in which position they are provided with securing and binding means illustrated in Fig. 25.

Fig. 27 is an elevation of a crankshaft which may be made in accordance with the method and by the mold apparatus of the present invention.

Fig. 28 is a vertical section of a mold for casting a single crankshaft.

Fig. 29 is a fragmentary vertical transverse section showing the essential parts of a molding machine whereby the sections of the mold are made by the use of compressed air, the section being taken substantially on the plane of lines 29—29 of Fig. 30, and Fig. 30 is a plan view of the intermediate member located between the flask and the sand carrying hopper of such apparatus.

Like reference characters refer to like parts in the different figures of the drawings.

Figure 14:
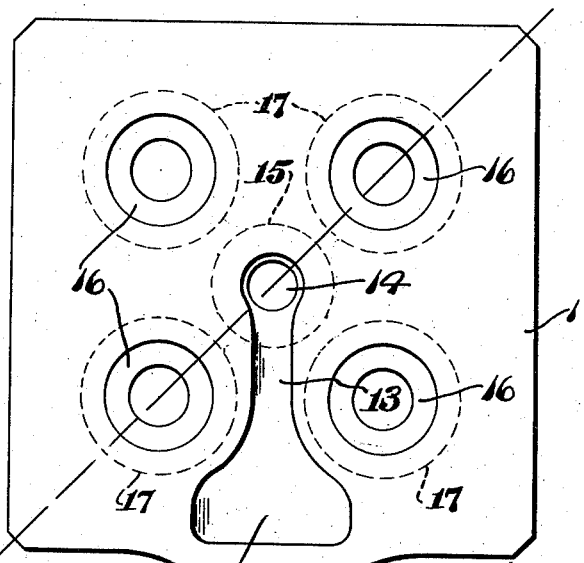
Figure 13:
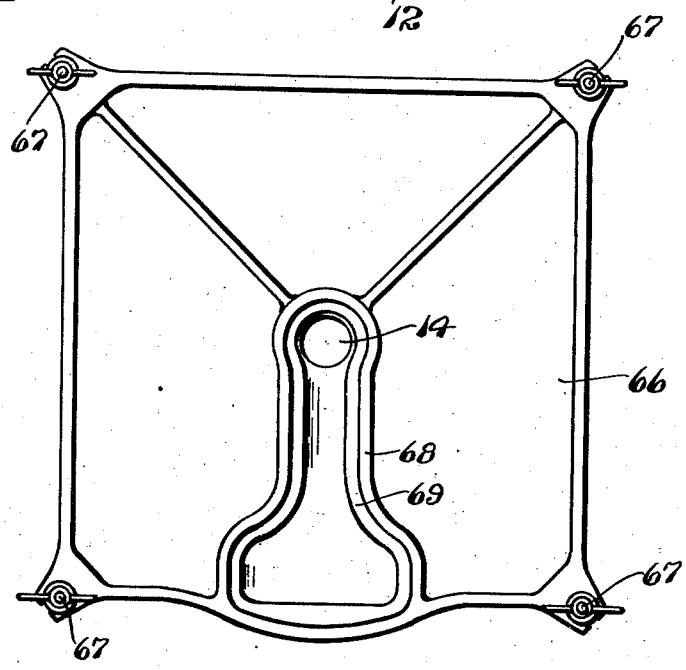

The mold comprises a plurality of sections 1 to 11, inclusive, as shown in Fig. 1 disposed one upon the other, the section 1 being the uppermost section, the section 11 the bottom or base section and the sections 2 to 10, inclusive between. The uppermost section 1 (Figs. 2 and 14) is substantially square in outline and in its upper part and to one side thereof has a pouring basin 12 into which molten iron may be delivered with a horizontal runner 13 leading therefrom to a vertical centrally positioned sprue opening 14 which extends through the section 1 and at its lower end joins with an enlargement 15. In this form of the invention four crankshafts are to be cast. The mold section 1 is provided with four feeder cavities 16 located around and spaced radially from the central sprue 14. The feeder cavities are reduced somewhat at their lower end and join with a circular disk-shaped cavity 17 located one at the lower end of each of the feeder cavities 16 and at the horizontal lower side of said section 1.

Figure 15:
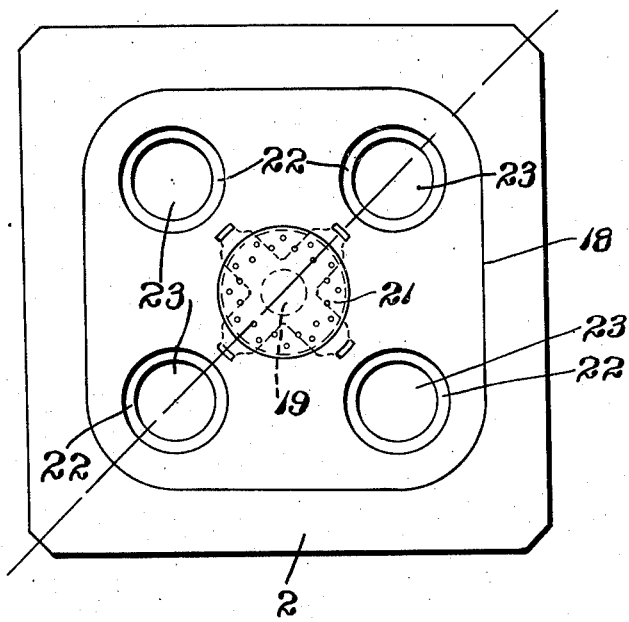

The next section 2 of the mold (Figs. 3 and 15) in its upper portion is recessed to receive a complementary core section 18 which is set in the recess and has its upper side flush with the upper side of the section 2. At the center of this second section 2 at the lower part thereof is a central vertical opening 19 in alinement with the opening 14. In the upper part of the central portion of the section 2 the opening is enlarged, as indicated at 20, in order that a skim gate 21 may be disposed therein with its upper side flush with the upper side of the inserted core section 18. When the section 1 is placed upon the section 2 as shown in Fig. 1, the enlargement 15 at the lower end of the opening 14 is directly over the skim gate 21 through which there are a large number of small openings for passing the molten iron, checking its speed and preventing the passage of dirt particles, scale and the like.

Also, in the upper side of the part 18 is a shallow recess 22 smaller in diameter than the recess 17 directly above it but in axial alinement therewith. Extending downwardly from the shallow recess 22 is a circular opening or cavity 23 which, a short distance above the lower side of the part 18 joins with a cavity 24, the sides of which diverge downwardly and outwardly from the lower end of the opening 23 to the bottom side of the core part 18. Below the cavities 23 and 24 are vertical central cavities 25 extending nearly to the lower side of the section 2 and joining with shallow cavities 26 which are of the same shape as and are complementary to and cooperate with cavities 28 in the upper side of the next lower section 3 whereby when iron fills the two cojoining cavities 26 and 28 transverse flanks of the crankshaft are provided between the bearing portion made in the cavities 25 and in similar cavities in the next lower section 3.

Figure 16:
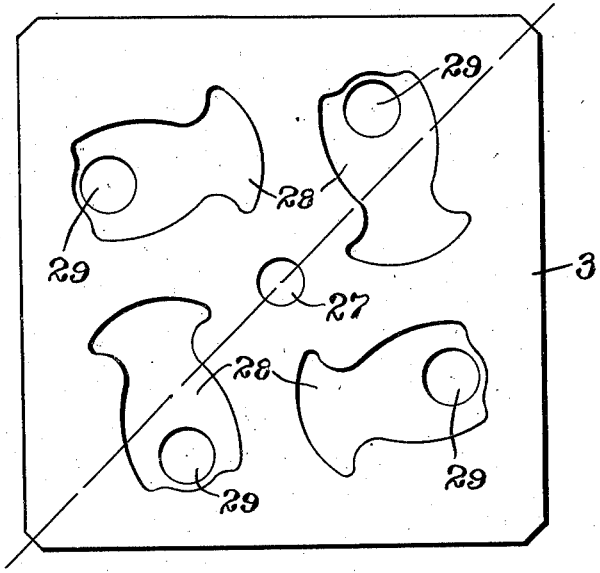
Figure 17:
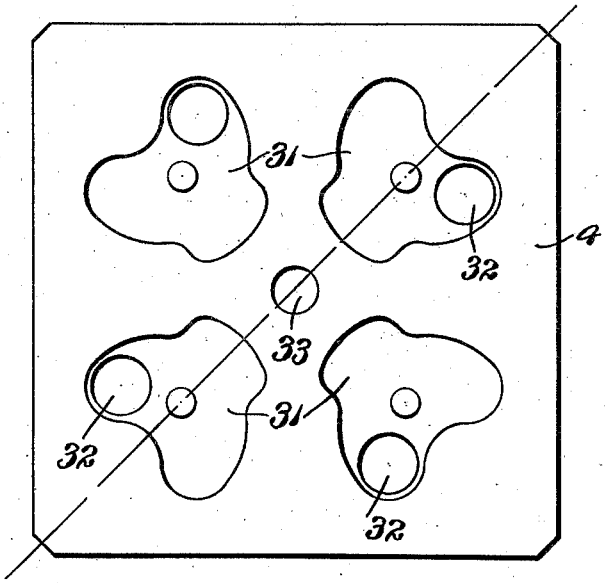

The next section 3 (Figs. 4 and 16) has a central vertical opening 27 of the same diameter as the opening 19 in section 2 next above and in direct vertical alinement therewith. The cavities 28 in the upper side of the section 3 previously described join with vertical bearing cavities 29 which extend through the section 3 and which at their lower ends connect with the cavities 30 in the lower side of said section 3, the same being complementary to and of the same shape as mold cavities 31 in the upper side of the next lower section 4. Said next section 4 has vertical bearing cavities 32 connecting with the cavities at 31 and passing vertically through the mold section (Figs. 5 and 17). The cavities at 30 and 31 are of the shape shown in Fig. 17. At the central part of the section 4 is a short vertical opening 33 which has four branches 34 leading downwardly outwardly therefrom and at right angles to each other connected by means of gates 35 with cavities 36 in the lower side of the section 4 and which are connected with the cavities 31 in the upper side thereof by the vertical bearing cavities 32.

Figure 18:
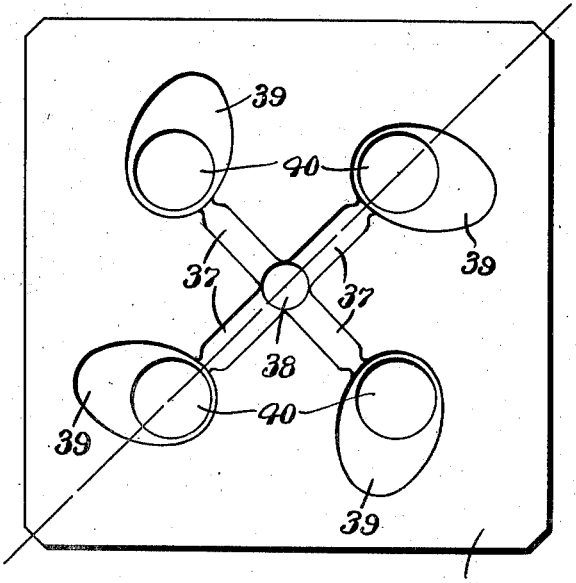

The next lower section 5 (Figs. 6 and 18) has a central opening 38 therethrough in axial alinement with the openings 27, 19 and 14. At its upper end are radial gates 37 connecting with shallow cavities 39 in the upper side of the section 5 which are of the same shape and in conjunction with the cavities 36 previously described at the underside of the section 4. Vertical bearing openings or cavities 40 extending downwardly from the cavities 39 and join with shallow cavities 41 at the lower side of the section 5.

Figure 19:
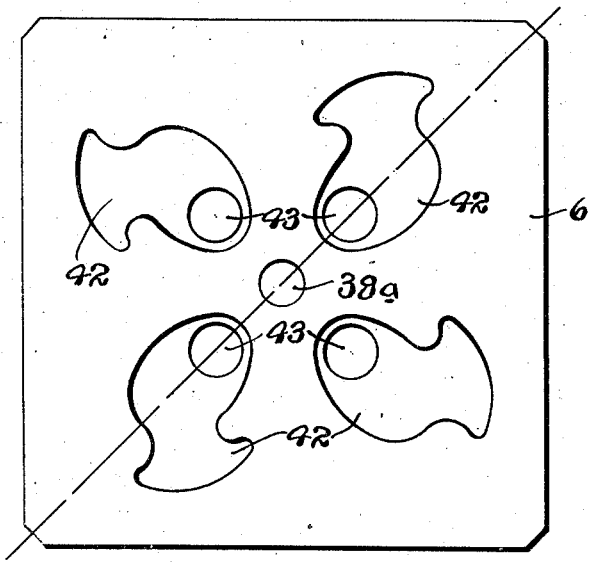

Section 6 of the mold which is to be located below section 5 (Figs. 7 and 19) has shallow cavities 42 in its upper side of the same outline and shape as the cavities 41 in the lower side of the mold 5. Likewise, there are vertical bearing cavities 43 extending downwardly from the cavities 42 and joining with shallow cavities 44 in the lower side of the section 6. At the center and in the upper side of the section 6 is a recess 38a which when the mold is assembled is located directly below the lower end of the opening 38 through the section 5 and which provides a lower closed end for the mold sprue, the metal poured (Fig. 1) passing through the skim gate 21 following through the openings 19, 27 and 33 and passing through the gates 34, 35 and 37 laterally to the crankshaft mold cavities. The enlarged gates 34 hold a relatively large body of molten metal and provide, when filled with the molten metal, feeders of metal to the intermediate portion of the cast crankshafts to compensate for shrinkage.

Figure 20:
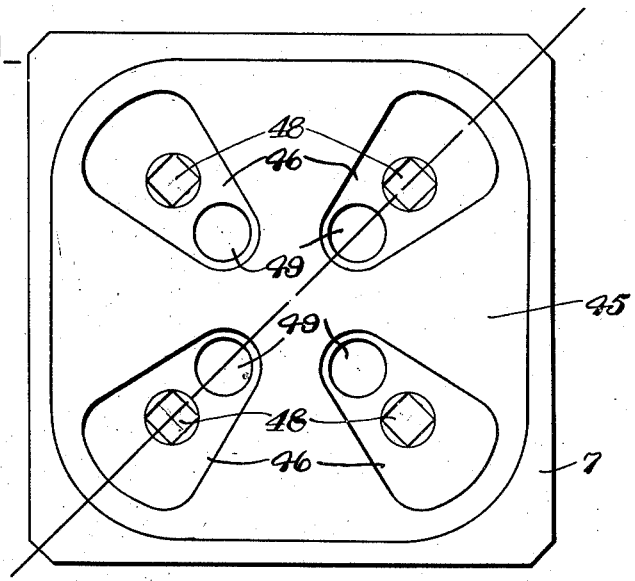

Section 7 to be placed next above the section 6 has an auxiliary core section 45 located in the upper part thereof similar to the auxiliary section 18 at the upper side of the section 2. An enlarged opening 46, one for each of the crankshafts to be cast, is made through said auxiliary core section 5. The counterweight vibration absorbing part of the crankshaft which is cast in the cavities 46 has a projecting flange made by the metal cast into the recess at 47. The dividing line between the sections 7 and 45 is across this flange as shown, so that in the upper part of the section 7 there are complementary shallow recesses which when the two sections are together as shown in Figs. 8 and 20, make a single large cavity 46. At the lower side of this cavity and in the upper side of the recessed portion of the section 7 are cavities 48 to serve as locating recesses for metal cores which are located one in each of the cavities 46 and around which the molten metal passes in the casting operation, thereby avoiding undue shrinkage. A bearing cavity 49 extends nearly through the section 7 and joins with a shallow cavity 50 in the lower side of the section 7 as shown in Fig. 8, one for each of the four crankshafts to be cast.

Figure 21:
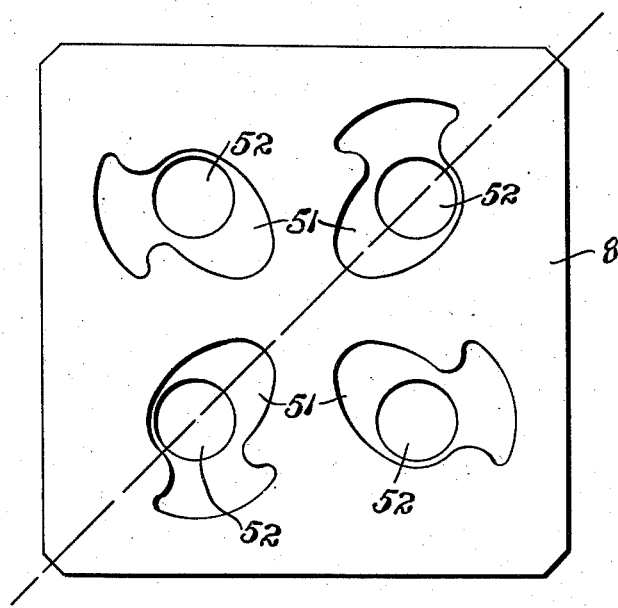
Figure 22:
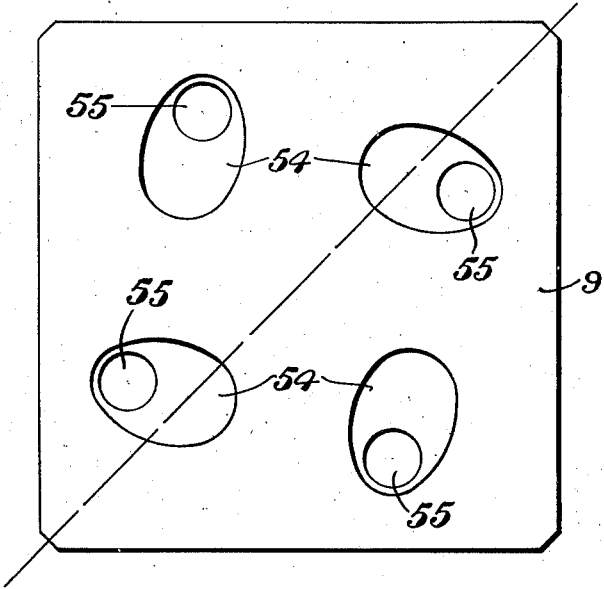

The succeeding lower cavity 8 has shallow cavities 51 of the same outline and contour as the cavities 50 in the lower side of section 7. Cylindrical bearing cavities 52 extend from the shallow cavities 51 (Figs. 9 and 21) nearly through the section 8 and join with shallow cavities 53 in the lower sides thereof. The next lowermost section 9 (Figs. 10 and 22) have shallow cavities 54 in their upper sides of the same shape and in direct alined conjunction with the cavities 53 previously described in the lower side of the section 8. Vertical cylindrical bearing cavities 55 extend from the cavities 54 downwardly through the section 8 and join with shallow cavities 56 in the lower side of the section 9.

Figure 23:
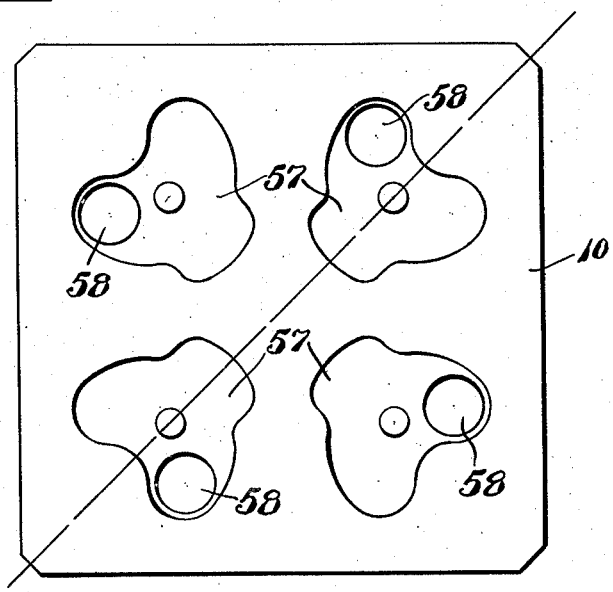

The next lower section 10 (Figs. 11 and 23) has cavities 57 in its upper side of the same shape and form as the shallow cavities 56 in the lower side of the section 9 and join therewith. Vertical cylindrical openings 58 extend downwardly from the cavities 57 and join at their lower ends with shallow cavities 59 in the lower side of the section 10.

Figure 24:
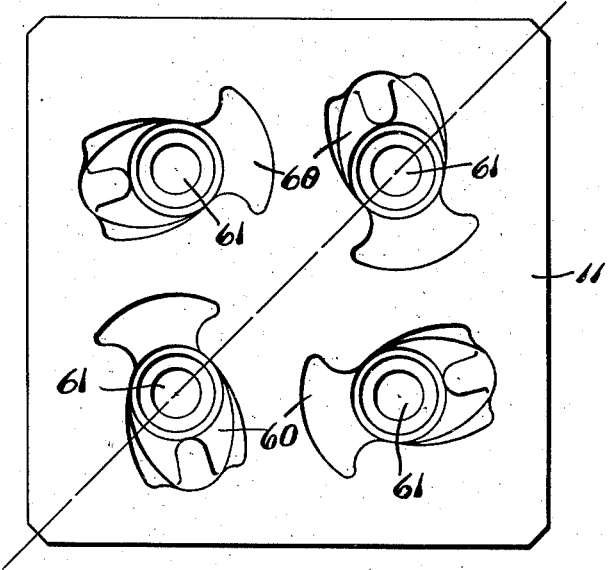

The lowermost section 11 has shallow cavities 60 (Figs. 12 and 24) in its upper side corresponding in shape and outline with the cavities 59 in the lower side of the section 10. From these cavities vertical bearing cavities 61 extend downwardly partly through the section 11 so that the mold cavities for each of the four crankshafts which are to be cast end a distance above the lower side of the section 11.

The various sections of the mold after they have been made from core sand and baked to a relatively hard consistency are assembled one over the other as shown in Fig. 1 to make a stack and metal cores 62 are located in the cavities 46 as previously stated. The method of assembling the several sections 1 to 11, inclusive, is shown in Fig. 26. A trough having upwardly and outwardly diverging sides 63 has supporting feet 64 whereby it may be placed upon a horizontal floor. The sections are then disposed in proper relative position to each other and brought together as shown in Fig. 26. A bottom frame or pan 65 is placed against the lower end of the lowermost section 11 and a covering frame 66 placed against the upper end of the uppermost section 1. At the corners of these bottom and cover frames are lugs spaced apart from each other whereby rods 67 may be placed between the lugs at the three exposed corners of the mold sections. The rods 67 are provided with heads at their lower ends and are threaded at their upper ends to receive thumb nuts. By attaching and partially tightening three of the rods and thumb nuts the mold sections are secured together and then the fourth and remaining rod 67 and the thumb nut thereon is put in place and tightened. The upper cover member 66 has an opening 68 therein lined with fire clay at 69 corresponding to the pouring basin 12, runner 13 and vertical sprue opening 14, in the upper side of the upper section 1.

In Figs. 29 and 30 the way in which the various mold sections are produced is shown. For each section there is a flask 70 of a size, shape and depth corresponding to the section which is to be made. For example, in Fig. 29 the flask 70 therein is for making the lower section 11. Patterns 71 are located and permanently secured on the bottom of the flask. In the bottom of the flask are small openings 72 covered by screens 73. The patterns 71 correspond to the cavities 61 and 60 which are to be made in the upperside of the mold section 11. A hopper 74 is designed in the molding machine which is used to carry the sand for the mold section. At its lower side it is closed by a bottom 75 secured in place as shown. Interposed between the bottom of the hopper and the upper side of the flask 70 is a plate 76 which has oppositely extending ears 77 with locating pins 78 for properly positioning the plate upon the flask 70 by passing the pins through guiding bushings therefor carried by horizontally projecting ears on the flask directly below the ears 77 on the plate 76. A plurality of sleeves 79 are formed integral with the plate 76 and extend upwardly having central vertical openings 80 therethrough which are adapted to come into conjunction with similar openings 81 made in the bottom 75 of the hopper. The plate 76 is also provided with a plurality of air escape openings 82 covered with a screen 83. The sand is forced through the openings 81 and 80 into the flask and around the patterns 71, air escaping through the openings 72 and 82 while the sand is held substantially from escaping by the screens 73 and 83. There may be some sand collect at the upper part of the plate 76 but this can be blown off by projecting a current of compressed air against it. The sand is pressed to the desired density by the action of the compressed air and after the flask is filled the hopper 74 is turned to one side the plate 76 removed, and the flask inverted and withdrawn from the mold section which has been made. It is, of course, to be understood that there will be different patterns and flasks used for each of the mold sections to be made and that in most cases it will be necessary that parts of the patterns be carried at the upper side of the bottom of the flask 70 at the lower side of the plate 76. In a day's or a week's run of the crankshaft casting, a very large number of the sections 11, for example, may be made before the molding machine is changed to use a different flask 70 and a different plate 76 for the next section and so on until the required number of each of the sections for making up a predetermined quantity of molds have been made.

In Fig. 28 a mold is shown for the production of a single crankshaft, the sections 1a to 11a, inclusive, being positioned vertically one on the other and the crankshaft mold cavity extending generally in a vertical direction from the upper end of the mold to the lower end thereof where it terminates a short distance above the bottom of the lowermost section 11a. Pouring the metal is at the upper end of the feeder cavity 16 in the upper section 1a and there is no central sprue with gates leading to several crankshaft mold cavities as in the structure shown in Fig. 1. The auxiliary core sections 18a and 45a are used in the sections 2a and 7a in the same manner and for the same purpose as previously described with respect to the auxiliary sections 18 and 14 and the main sections 2 and 7.

Between the sections 3a and 4a and the sections 9a and 10a the mold cavities are modified somewhat so as to lie at an angle to the horizontal to reproduce the finished crankshaft, as shown in Fig. 7. In this case the contiguous sections 3a and 4a, also 9a and 10a are formed with division lines located on an angle to the horizontal as shown and as apparent from the drawings.

When the crankshaft is cast in either form of mold it produces a crankshaft such as shown at 84 in Fig. 27 used with the mold that appears in Fig. 28, and modified only in slight respects when produced in the mold as shown in Fig. 1. At the division lines between the several sections 1 to 11 or 1a to 11a, inclusive, fins appear, indicated at 85 in Fig. 27, by reason of the molten metal having a tendency to attempt to penetrate between the adjacent faces of the contiguous sections. These fins are readily chipped, filed or ground or otherwise removed. There are no fins on any of the bearing portions of the crankshaft. This greatly reduces the cost of completing and rendering the cast shaft suitable for use in engines.

The invention which has been described is one in continuous practical use for the production of cast crankshafts for engines which are more and more coming into extensive use. The invention is defined in the appended claims and is to be considered comprehensive of all forms of structure coming within their scope.

I claim:

1. A mold for crankshafts comprising, a plurality of horizontally disposed mold sections stacked one upon another, a portion of said sections having a mold cavity extending through the sections into which molten metal is to be poured to produce the crankshaft, the division lines between the horizontally disposed mold sections being transverse to the mold cavity beyond the ends of any parts thereof in which bearings of the crankshaft are cast.

2. An elongated mold for casting crankshafts comprising, a plurality of horizontally positioned mold sections disposed on top of each other and of such varied thicknesses that fins, resulting from the casting operation, will appear either at the ends or beyond the ends of each bearing section, a plurality of feeder cavities in the upper mold section, said upper mold section also having a pouring basin, a centrally positioned sprue opening, and a runner connecting said basis and sprue opening, said sprue opening extending downwardly and in alinement with openings in a plurality of lower mold sections forming a vertical passageway therethrough.

DONALD J. CAMPBELL.